(12) United States Patent
Duan et al.

(10) Patent No.: US 11,378,748 B1
(45) Date of Patent: Jul. 5, 2022

(54) OPTICAL FREQUENCY DISCRIMINATORS BASED ON FIBER BRAGG GRATINGS

(71) Applicants: Lingze Duan, Madison, AL (US); Dipen Barot, Huntsville, AL (US)

(72) Inventors: Lingze Duan, Madison, AL (US); Dipen Barot, Huntsville, AL (US)

(73) Assignee: Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 0 days.

(21) Appl. No.: 17/187,223

(22) Filed: Feb. 26, 2021

Related U.S. Application Data

(60) Provisional application No. 62/981,788, filed on Feb. 26, 2020, provisional application No. 62/981,781, filed on Feb. 26, 2020.

(51) Int. Cl.
 *G02B 6/27* (2006.01)
 *G02B 6/124* (2006.01)
 (Continued)

(52) U.S. Cl.
 CPC ....... *G02B 6/2773* (2013.01); *G02B 6/02195* (2013.01); *G02B 6/124* (2013.01); *H04B 10/2519* (2013.01)

(58) Field of Classification Search
 CPC .............. G02B 6/2773; G02B 6/02195; H04B 10/2519
 See application file for complete search history.

(56) References Cited

U.S. PATENT DOCUMENTS 3,549,236 A  12/1970 Mink
2012/0251122 A1* 10/2012 Grobe ................ H04J 14/0282
                                                              398/79

(Continued)

OTHER PUBLICATIONS

Dingel, et al., "Optical Frequency Discriminator with Ultrahigh Amplitude and Phase Linearity for Frequency Modulated Microwave Photonic Links," IEEE, Oct. 2016.

(Continued)

*Primary Examiner* — Sung H Pak
(74) *Attorney, Agent, or Firm* — Maynard Cooper & Gale, P. C.; Jon E. Holland

(57) ABSTRACT

The present disclosure generally pertains to systems and methods that utilize optical frequency discriminators based on fiber Bragg gratings. In some embodiments, an optical frequency discriminator has a polarization-maintaining fiber Bragg grating (PM-FBG), and an incoming polarized optical signal is reflected from the PM-FBG, which differentiates the two polarization modes in the incoming signal according its frequency relative to the two resonance peaks of the PM-FBG. The optical frequency discriminator then compares (e.g., subtracts) the reflected power in the two polarization modes to provide an output having an amplitude that varies linearly with the frequency of the incoming signal. This output may then be used to extract various information about the frequency of the incoming signal. As an example, the output may be used to recover data that has been frequency modulated onto the incoming signal or to characterize the frequency noise of the incoming signal.

10 Claims, 5 Drawing Sheets

(51) Int. Cl.
*G02B 6/02* (2006.01)
*H04B 10/2519* (2013.01)

(56) References Cited

U.S. PATENT DOCUMENTS

2019/0025431 A1* 1/2019 Satyan .................. G01S 7/4914
2019/0027897 A1* 1/2019 Wei ........................ G01S 7/497

OTHER PUBLICATIONS

"Polarization-Maintaining Optical Fiber," Wikipedia, Wikimedia Foundation, Feb. 2021, https://en.wikipedia.org/wiki/Polarization-maintaining_optical_fiber.
"Fiber Bragg Grating," Wikipedia, Wikimedia Foundation, Feb. 2021, https://en.wikipedia.org/wiki/Fiber_Bragg_grating.
Ye, et al., "A Polarisation Maintaining Fibre Bragg Grating Interrogation System for Multi-Axis Strain Sensing," The International Society of Optical Engineering, Proceedings of SPIE, Jul. 2002, vol. 4694.

\* cited by examiner

OPTICAL FREQUENCY DISCRIMINATORS BASED ON FIBER BRAGG GRATINGS

CROSS REFERENCE TO RELATED APPLICATION

This application claims priority to U.S. Provisional Patent Application No. 62/981,781, entitled "Optical Frequency Discriminator Based on PM-FBG" and filed on Feb. 26, 2020, which is incorporated herein by reference. This application claims priority to U.S. Provisional Patent Application No. 62/981,788, entitled "Fiber-Optic FM/PM Demodulator Based on Polarization-Maintaining Fiber Bragg Gratings" and filed on Feb. 26, 2020, which is incorporated herein by reference.

STATEMENT REGARDING FEDERALLY SPONSORED RESEARCH OR DEVELOPMENT

This invention was made with Government support under contract ECCS1606836 awarded by the National Science Foundation. The Government has certain rights in the invention.

RELATED ART

An optical frequency discriminator (OFD) is a device that can detect changes in the frequency of an optical signal from its nominal frequency by converting frequency changes to amplitude changes. OFDs have numerous applications. As an example, an OFD may be used to characterize the frequency noise of an optical frequency source and also to generate an error signal that can be used to stabilize an optical source through feedback against any undesired frequency fluctuations. An OFD may also be used in optical communication in order to demodulate an optical signal that has been frequency modulated. Various other uses of OFDs are possible.

An OFD often utilizes an interferometer in order to make precise measurements of a received optical signal. However, interferometers are often bulky and expensive, and improved designs of OFDs having smaller footprints and/or reduced costs are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods that utilize optical frequency discriminators based on fiber Bragg gratings. In some embodiments of the present disclosure, an optical frequency discriminator has a polarization-maintaining fiber Bragg grating (PM-FBG), and an incoming polarized optical signal is reflected from the PM-FBG, which has a respective reflectivity for each polarization mode that is dependent on the frequency of the incoming signal. The optical frequency discriminator then compares (e.g., subtracts) the powers of the polarization modes for the reflected signal to provide an output having an amplitude that varies linearly with the frequency of the incoming signal. This output may then be used to extract various information about the frequency of the incoming signal. As an example, the output may be used to recover data that has been frequency modulated onto the incoming signal or to characterize the frequency noise of the incoming signal.

Figure 1:
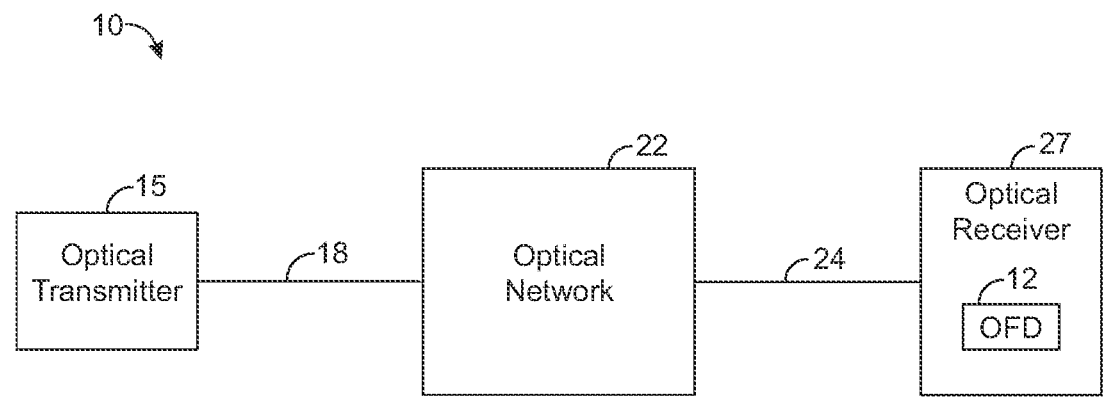
FIG. 1 is a block diagram illustrating an exemplary embodiment of an optical communication system.

FIG. 1 depicts an exemplary embodiment of an optical communication system 10 that has an optical frequency discriminator (OFD) 12 that is configured to demodulate data from an optical signal communicated through the system 10. In this regard, the system 10 has an optical transmitter 15 that is configured to use frequency modulation in order to modulate an optical carrier signal with data. The optical transmitter 15 is coupled to an optical network 22 via an optical fiber 18 that carries the modulated optical signal to the network 22, and the network 22 routes the optical signal to an optical fiber 24 that is coupled to an optical receiver 27, which is configured to receive and process the signal. As shown by FIG. 1, the optical receiver 27 has an OFD 12 that is used to demodulate the optical signal in order to recover the data originally modulated onto the carrier signal by the optical transmitter 15.

Figure 2:
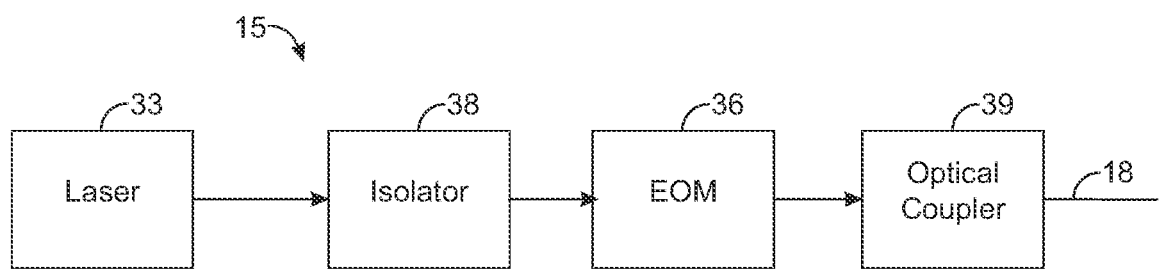
FIG. 2 is a block diagram illustrating an exemplary embodiment of an optical transmitter, such as is depicted by FIG. 1.

FIG. 2 depicts an exemplary embodiment of the optical transmitter 15. In this regard, the transmitter 15 has a laser 33 that is configured to generate an optical carrier signal at a certain wavelength. The laser 33 is optically coupled to an electro-optic modulator (EOM) 36 through an optical isolator 38. The modulator 36 is configured to use frequency modulation in order to modulate data onto the carrier signal to provide a modulated optical signal. This modulated optical signal may be a sinusoidal carrier signal that has a frequency or period that is slightly varied over time by the modulator 36 based on the data that is used to modulate the frequency. As shown by FIG. 2, the modulator 36 is optically coupled to the fiber 18 through an optical coupler 39 such that the modulated optical signal from the modulator 36 passes through the coupler 39 and the fiber 18 to the optical network 22 (FIG. 1).

Figure 3:
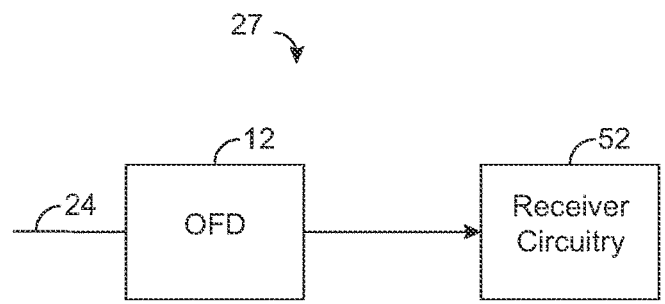
FIG. 3 is a block diagram illustrating an exemplary embodiment of an optical receiver, such as is depicted by FIG. 1.

FIG. 3 depicts an exemplary embodiment of the optical receiver 27. As shown by FIG. 3, the optical receiver 27 has an OFD 12 that is optically coupled to the optical fiber 24 through which the OFD 12 receives the optical signal that has been frequency modulated by the optical transmitter 15 (FIG. 2). As will be described in more detail hereafter, the OFD 12 processes such optical signal in order to provide an analog output having an amplitude that varies linearly with the frequency of the modulated optical signal received from the fiber 24. Receiver circuitry 52 is configured to process the output of the OFD 12 as may be desired. As an example, the receiver circuitry 52 may be configured to convert the output of the OFD 12 into digital data representing the data used by the optical transmitter 15 in order to frequency modulate the carrier signal generated by the laser 33 (FIG. 2).

Note that the receiver circuitry 52 may be implemented in hardware or a combination of hardware and software. As an example, the receiver circuitry 52 may be implemented in hardware using one or more field programmable gate arrays (FPGAs), application-specific integrated circuits (ASICs), or other types of hardware components. In addition, the receiver circuitry 52 may comprise one or more processors, such as digital signal processors (DSPs) or central processing units (CPUs), encoded with software for performing various functions. Other types of receiver circuitry 52 may be used in other embodiments.

Figure 4:
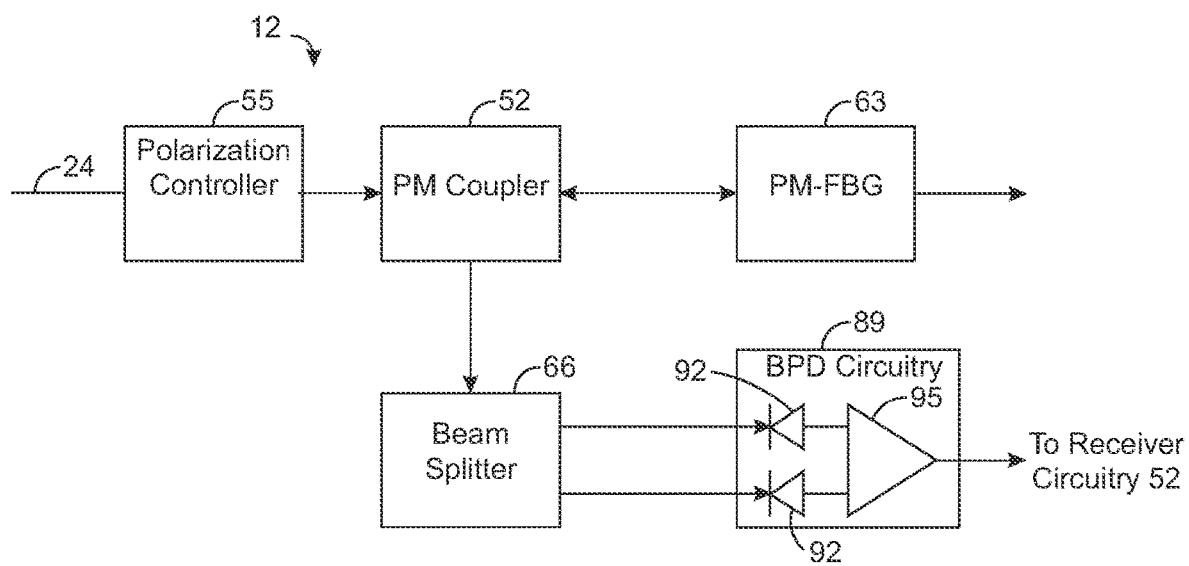
FIG. 4 is a block diagram illustrating an exemplary embodiment of an optical frequency discriminator, such as is depicted by FIG. 3.

FIG. 4 depicts an exemplary embodiment of the OFD 12. As shown by FIG. 4, the optical fiber 24 is optically coupled to a polarization controller 55 that is configured to control a polarization of the optical signal passing through it so that the optical signal is properly polarized at the output of the controller 55. In this regard, the optical signal is polarized such that it contains two polarization modes. For one of the polarization modes, a component of the optical signal propagates along a first polarization direction (referred to herein as the "x polarization direction"), and for the other polarization mode, another component of the optical signal propagates along a second polarization direction (referred to herein as the "y polarization direction"), noting that the two polarization directions are preferably orthogonal to each other. Ideally, the controller 55 controls the polarization of the optical signal such that its optical power in each polarization direction is approximately equal, though it is possible in other embodiments for the optical power of the signal in one polarization direction (e.g., the x polarization direction) to be different than the optical power of the signal in the other polarization direction (e.g., the y polarization direction).

As shown by FIG. 4, the polarization controller 55 is optically coupled to a polarization-maintaining fiber Bragg grating (PM-FBG) 63 through a polarization-maintaining (PM) coupler 58. As known in the art, a "polarization-maintaining" device (e.g., PM optical fiber) is a device in which linearly polarized light introduced to the device maintains a linear polarization during propagation through the device. That is, the polarization of the light is preserved as it propagates, and there is very little, if any, cross-coupling of optical power between the polarization modes. During manufacturing of a typical PM device, linear birefringence is introduced so that there are different polarization modes with different phase velocities along a length of the device in the direction of light propagation. PM devices, such as PM couplers and PM-FBGs, are generally well known and are widely available.

The PM coupler 58 is also optically coupled to a fiber-coupled polarization beam splitter 66 or other type of beam splitter for splitting the polarization modes, as will be described in more detail below. The PM coupler 58 is a directional coupler that is configured to permit light received from the polarization controller 55 to pass to the PM-FBG 63 while blocking or otherwise preventing such light from passing to the beam splitter 66. The PM coupler 58 is also configured to permit a portion of the light received from the PM-FBG 63 to pass to the beam splitter 66.

The PM-FBG 63 is configured to reflect the light from the PM coupler 58 such that the reflected signal is received by the PM coupler 58 and transmitted to the beam splitter 66. A fiber Bragg grating (FBG) is a well-known device that that has periodic structural variations that cause the FBG to reflect specific wavelengths of light and transmit the other wavelengths. In some embodiments, the PM-FBG 63 is implemented as an optical fiber having periodic variations in refractive index along its core, as shown by FIG. 5.

Figure 5:
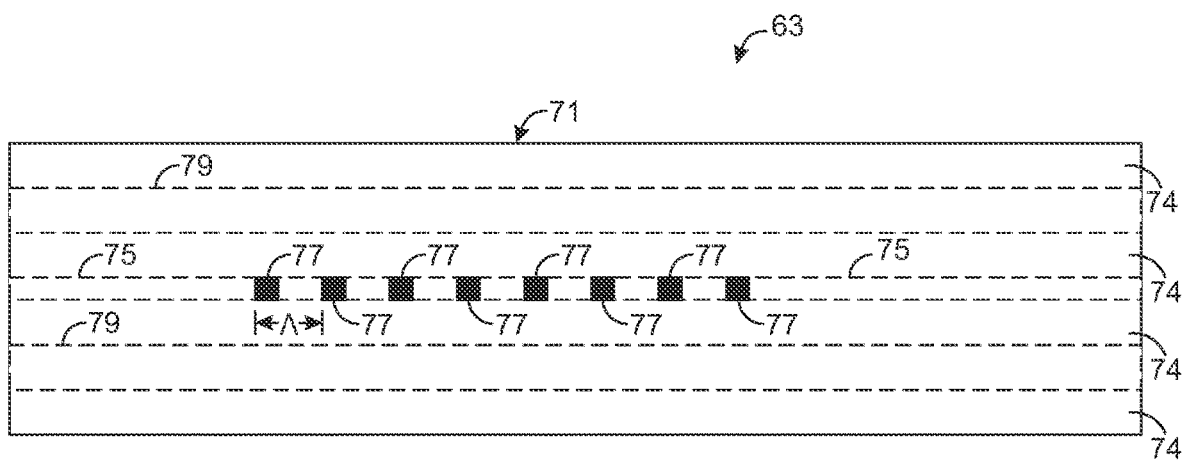
FIG. 5 is a side view illustrating an exemplary embodiment of polarization-maintaining fiber Bragg grating (PM-FBG), such as is depicted by FIG. 4.
Figure 6:
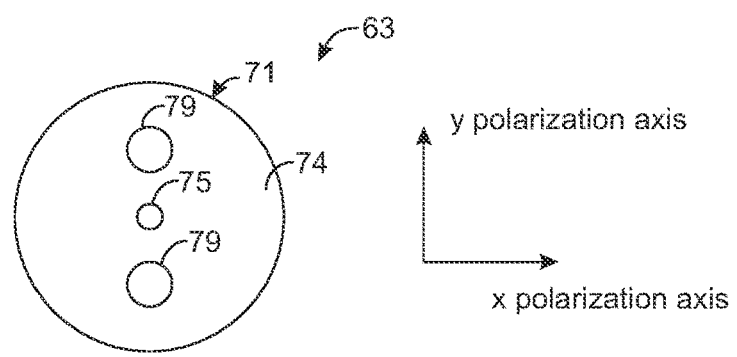
FIG. 6 is an end view of the PM-FBG depicted by FIG. 5.

In this regard, the PM-FBG 63 of FIG. 5 comprises an optical fiber 71 having a core 75 surrounded by cladding 74. As shown by FIG. 5, the optical fiber 71 also has a pair of stress rods 79 on opposite sides of the core 75 and extending through the cladding 74 in a direction parallel with the core 75. Note that the core 75 and the stress rods 79 are surrounded by the cladding, as shown by FIG. 6, such that the core 75 and stress rods 79 are not actually visible from the perspective of FIG. 5 but are nevertheless shown in FIG. 5 for simplicity of illustration.

The refractive index of the cladding 74 is different than the refractive index of the core 75 such that light propagates through the core 75. That is, the cladding 74 generally functions as a waveguide for guiding the light along the core 75, as is well-known for optical fibers. As shown by FIG. 5, the core 75 has periodic regions 77 (which are shaded in FIG. 5) in which the index of refraction is different than the index of refraction of the other regions (which are unshaded in FIG. 5) of the core 75. The presence of the regions 77 causes light at certain wavelengths to reflect depending on the period ($\Lambda$) of the regions 77 while light at other wavelengths continues to propagate along the core 75.

The rods 79 are designed to induce stress in the fiber 71 to produce birefringence for maintaining the polarization of the light passing through the fiber 71. In other embodiments, other designs for producing birefringence for this purpose are possible, as known in the art.

Figure 7A:
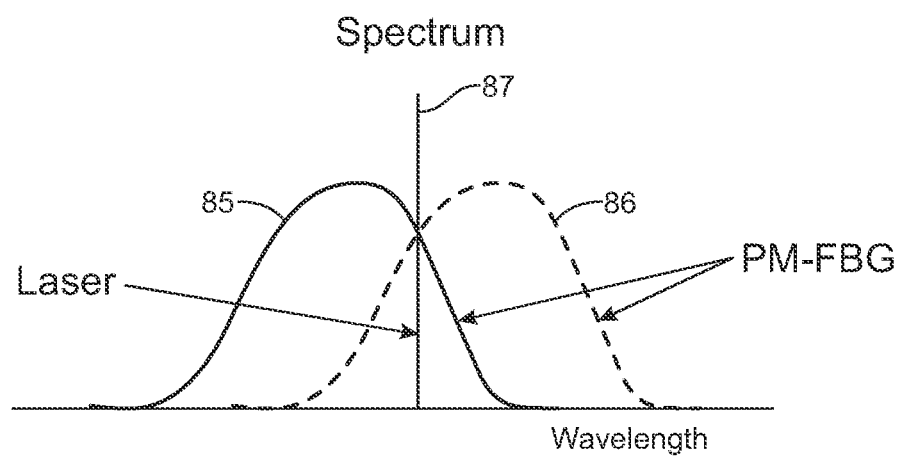
FIG. 7A is a graph illustrating an exemplary reflectivity profile of a PM-FBG, such as is depicted by FIG. 5, relative to a polarized optical signal transmitted at a reference frequency.
Figure 8A:
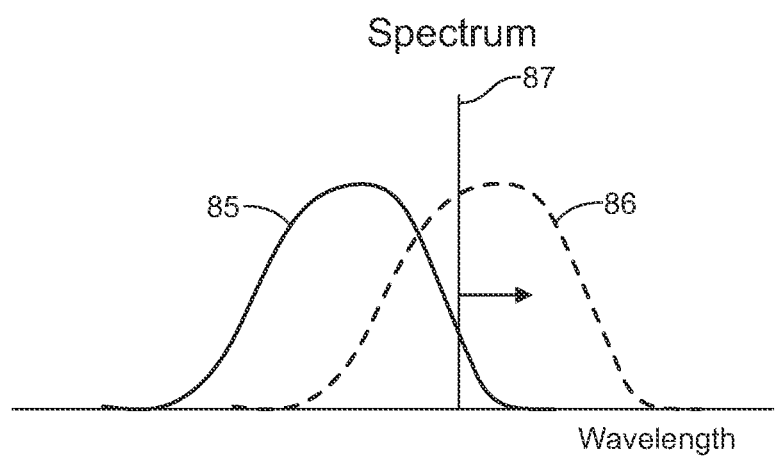
FIG. 8A is a graph illustrating the reflectivity profile of FIG. 7A relative to a polarized optical signal transmitted at a frequency different than the reference frequency.

The x polarization mode in the PM-FBG 63 experiences a slightly different refractive index than the y polarization mode such that the reflectivity of the PM-FBG 63 has a spectrum with two resonance peaks 85, 86 that are slightly offset from one another, as shown by FIG. 7A. One resonance peak 85 is for one of the polarization modes, and the other resonance peak 86 is for the other polarization mode. Reference line 87 represents or marks the frequency of the incoming signal, and FIG. 7A shows the situation when the frequency of the incoming signal is at the crossover point for the peaks 85, 86. FIG. 8A, on the other hand, shows a situation when the frequency of the incoming signal has decreased (as indicated by reference line 87 appearing further right or, in other words, at a longer wavelength) relative to FIG. 7A.

As shown by FIG. 7A, the spectral profiles defining the peaks 85, 86 partially overlap, and the reflectivity for each respective mode is a function of the frequency of the incoming signal. That is, for each polarization mode, the reflectivity of the PM-FBG 63 changes with the frequency of the incoming signal. Thus, the power reflected by the PM-FBG 63 is effectively split between the two polarization modes in a frequency-dependent manner such that a change in the frequency of the incoming signal causes the reflected power in one of the polarization modes to increase while the reflected power in the other polarization mode decreases.

For example, as can be seen by comparing FIGS. 7A and 8A, a decrease in the frequency of the incoming signal (increase in wavelength) causes the PM-FBG 63 to reflect less power in the polarization mode corresponding to the peak 85 and to reflect more power in the polarization mode corresponding to the peak 86. Conversely, an increase in the frequency of the incoming signal (decrease in wavelength) causes the PM-FBG 63 to reflect more power in the polarization mode corresponding to the peak 85 and to reflect less power in the polarization mode corresponding to the peak 86. Notably, the foregoing assumes that the frequency of the incoming signal is sufficiently controlled such that it remains within the range where the peaks 85, 86 overlap.

Note that the wavelengths of the two resonance peaks 85, 86 are given by the following equations:

$$\lambda_s = 2\Lambda n_s \quad (1)$$

$$\lambda_f = 2\Lambda n_f \quad (2)$$

where $\Lambda$ is the grating period, $\lambda_s$ is the wavelength of the resonance peak for a first polarization mode, $\lambda_f$ is the wavelength of the resonance peak for a second polarization mode, $n_s$ is the effective refractive index of the core 75 for the first polarization mode, and $n_f$ is the effective refractive index of the core 75 for the second polarization mode.

Referring to FIG. 4, the reflected signal with both polarization modes is received by the PM coupler 58, and the PM coupler 58 directs the reflected signal to the fiber-coupled polarization beam splitter 66, which like the other components of the discriminator 12 is configured to maintain the polarization of the reflected signal. The beam splitter 66 splits the reflected signal such that the two polarization modes corresponding to the peaks 85, 86 are separately transmitted to circuitry 89 that is configured to compare the powers of the polarization modes. Note that various configurations of the circuitry 89 and techniques for comparing the polarization modes are possible. In some embodiments, the circuitry 89 comprises a balanced photodetector (BPD) circuitry having a pair of photodiodes 92 and a comparator 95.

In this regard, each photodiode 92 is configured to receive a respective polarization mode x, y, and the comparator 95 subtracts the photodiode 92 output due to one mode from that due to the other. That is, the comparator 95 subtracts the output indicative of the optical power of one polarization mode from the output indicative of the optical power of the other polarization mode. As such, the output of the comparator 95 is an analog signal having a voltage indicative of the difference between the two photodiode outputs, which in turn is indicative of the difference between the optical powers of the two polarization modes reflected by the PM-FBG 63. Since the power reflectivities of the PM-FBG 63 in the two polarization modes x, y are determined by the two resonance peaks 85, 86, the frequency of the incoming optical signal relative to the two resonance peaks 85, 86 affects the amount of power being reflected by the PM-FBG 63 in each polarization mode and hence the eventual output of the comparator 95.

Figure 7B:
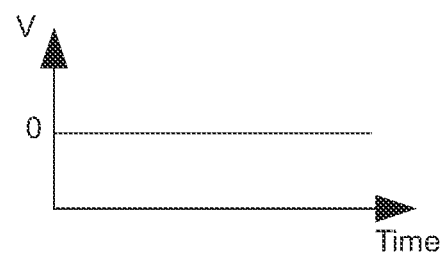
FIG. 7B is a graph of voltage versus time illustrating the output of balanced photodetector (BPD) circuitry, such as is depicted by FIG. 4, for the reference frequency illustrated by FIG. 7A.
Figure 8B:
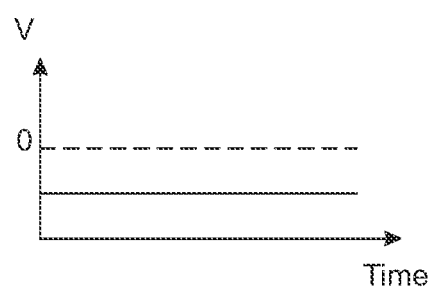
FIG. 8B is a graph of voltage versus time illustrating the output of BPD circuitry, such as is depicted by FIG. 4, for the frequency illustrated by FIG. 8A.

In this regard, as noted above, decreasing the frequency of the of the incoming signal (increasing wavelength) generally causes the PM-FBG 63 to reflect less power for the polarization mode corresponding to the peak 85 and more power for the polarization mode corresponding to the peak 86. As a result, the voltage of the signal output by the comparator 95 decreases linearly, as can be seen by comparing FIGS. 7B and 8B. Conversely, increasing the frequency of the incoming signal (decreasing wavelength) generally causes the voltage of the signal output by the comparator 95 to increase linearly. Thus, the voltage of the signal output by the comparator 95 varies linearly with the frequency of the incoming signal.

The receiver circuitry 52 (FIG. 3) is configured to receive the signal output by the BPD circuitry 89 and to process the signal as desired. For example, when the incoming signal has been frequency modulated with data so that it is desirable to recover the data, the receiver circuitry 52 may be configured to analyze the signal received from the BPD circuitry 89 in order to recover the data originally modulated onto the incoming signal by the transmitter 15 (FIG. 1). As an example, if the voltage is below a specified threshold, the receiver circuitry 52 may determine that the signal is indicating a bit of a certain logic level (e.g., a "0"), and if the voltage is above the specified threshold, the receiver circuitry 52 may determine that the signal is indicating a bit of another logic level (e.g., a "1"). Yet other techniques for recovering data from the signal output by the BPD circuitry 89 are possible in other embodiments.

Note that the OFD 12 may be used for purposes other than demodulating an incoming signal. As an example, the OFD 12 may be used to measure frequency drift or other frequency fluctuations of the optical transmitter 15 over time. In this regard, assume for illustrative purposes that the optical transmitter 15 is designed to transmit an optical signal at a certain frequency, referred to hereafter as the transmitter's "ideal transmit frequency." In such an embodiment, the optical transmitter 15 may be configured to transmit the optical signal without performing frequency modulation, and the OFD 12 receives and processes the signal, as described above. When the frequency of the signal transmitted by the transmitter 15 is at the ideal transmit frequency, the voltage of the signal output by the BPD circuitry 89 is at a certain level. For illustrative purposes, assume that the PM-FBG 63 is designed such that the voltage of the output signal is 0 Volts (V) when the incoming signal is at the ideal transmit frequency.

If the frequency of the transmitter 15 drifts such that there is a difference between the actual transmit frequency and the ideal transmit frequency, then the voltage of the signal output by the BPD circuitry 89 will change by a corresponding amount. That is, the voltage of the output signal of the BPD circuitry 89 varies linearly with the frequency of the incoming signal. Thus, the signal output by the BPD circuitry 89 can be analyzed by the receiver circuitry 52 to determine the actual frequency of the incoming signal and/or the extent to which the frequency has deviated from a reference value. Such information may be fed back to the transmitter 15 to permit the transmitter 15 to tune its frequency to the ideal transmit frequency. In other examples, the OFD 12 may provide other types of information about the frequency of the incoming signal for other uses and applications as may be desired.

Note that there are various techniques that may be used to provide feedback information to the optical transmitter 15 for use by the optical transmitter to tune the frequency of the optical signal transmitter therefrom. As an example, if the optical signal is transmitted from the optical transmitter 15 to the optical receiver 27 via an optical protocol that provides a control channel, the receiver circuitry 52 of the optical receiver 27 may be configured to transmit the feedback information to the optical transmitter 15 via the control channel. The optical transmitter 15 may use such feedback information to determine the actual frequency of the transmitted signal or an extent to which the frequency of the transmitted signal should be adjusted in order to tune the frequency to a desired value.

In some cases the optical receiver 27 may be at the same location as the optical transmitter 15 and transmit feedback information directly to the optical transmitter 15. As an example, a beam splitter (not shown) may be used to transmit a portion of the optical signal from the transmitter 15 to the receiver 27 and another portion of such optical signal to an optical network or other device or system. In other embodiments, a separate communication channel through the optical network 22 or otherwise may exist between the optical transmitter 15 and the optical receiver 27 for communication of feedback information. Yet other techniques for communicating feedback information from the optical receiver 27 to the optical transmitter 15 are possible in other embodiments.

Now, therefore, the following is claimed:

1. An optical receiver having an optical frequency discriminator, the optical frequency discriminator comprising:
    a polarization controller configured to receive an incoming optical signal and to polarize the optical signal such that optical power is allocated into a first polarization mode and a second polarization mode;
    a polarization-maintaining (PM) coupler configured to receive the polarized signal and transmit the polarized signal;
    a polarization-maintaining fiber Bragg grating (PM-FBG) configured to receive the polarized signal transmitted by the PM coupler and to reflect at least a portion of the polarized signal thereby providing a reflected optical signal, the PM-FBG having reflectivities for the first polarization mode and the second polarization mode that are based on a frequency of the incoming signal;
    a beam splitter configured to receive the reflected optical signal and to split the first polarization mode from the second polarization mode in the reflected optical signal, thereby providing a first signal defined by a portion of the optical power in the first polarization mode and a second signal defined by a portion of the optical power in the second polarization mode; and
    first circuitry configured to compare the first signal and the second signal to provide a third signal having an amplitude that varies linearly with a frequency of the incoming optical signal received by the polarization controller.

2. The optical receiver of claim 1, wherein the polarization controller is configured to allocate an equal amount of the optical power into each of the first polarization mode and the second polarization mode.

3. The optical receiver of claim 1, wherein the first circuitry is configured to subtract the first signal from the second signal.

4. The optical frequency discriminator of claim 1, wherein the incoming optical signal received by the polarization controller is modulated with data, and wherein the optical receiver comprises second circuitry configured to recover the data based on the third signal.

5. The optical frequency discriminator of claim 1, wherein the incoming optical signal is transmitted by an optical transmitter, and wherein the optical receiver comprises second circuitry that is configured to provide, based on the third signal, feedback to the optical transmitter for use in tuning the frequency of the incoming optical signal.

6. A method, comprising:
    receiving an incoming optical signal;
    polarizing the optical signal such that the optical signal has a first polarization mode and a second polarization mode;
    receiving the polarized optical signal at a polarization-maintaining fiber Bragg grating (PM-FBG);
    reflecting at least a portion of the polarized signal by the PM-FBG thereby providing a reflected optical signal, the PM-FBG having reflectivities for the first polarization mode and the second polarization mode based on a frequency of the incoming signal;
    splitting the reflected optical signal thereby providing a first signal defined by optical power in the first polarization mode and a second signal defined by optical power in the second polarization mode; and
    comparing, with circuitry, the first signal and the second signal thereby providing a third signal indicative of the comparing, wherein the third signal has an amplitude that varies linearly with a frequency of the incoming optical signal.

7. The method of claim 6, wherein the polarizing comprises allocating an equal amount of the optical power into each of the first polarization mode and the second polarization mode.

8. The method of claim 6, wherein the comparing comprises subtracting the first signal from the second signal.

9. The method of claim 6, wherein the incoming optical signal is modulated with data, and wherein the method further comprises recovering the data based on the third signal.

10. The method of claim 6, wherein the incoming optical signal is transmitted by an optical transmitter, and wherein the method further comprises providing, based on the third signal, feedback to the optical transmitter for use in tuning the frequency of the incoming optical signal.

* * * * *